United States Patent
Tamura et al.

(10) Patent No.: US 6,887,581 B2
(45) Date of Patent: May 3, 2005

(54) LAMINATE FOR AUTOMOBILE PARTS

(75) Inventors: Tsutomu Tamura, Ohtsu (JP); Hideki Eguchi, Ohtsu (JP); Junji Koizumi, Nishikasugai-gun (JP); Satoru Watanabe, Nishikasugai-gun (JP)

(73) Assignees: Toyo Boseki Kabushiki Kaisha, Osaka (JP); Toyoda Gosei Co., Ltd., Aichi (JP)

( * ) Notice: Subject to any disclaimer, the term of this patent is extended or adjusted under 35 U.S.C. 154(b) by 364 days.

(21) Appl. No.: 10/132,253

(22) Filed: Apr. 26, 2002

(65) Prior Publication Data

US 2002/0197495 A1 Dec. 26, 2002

(30) Foreign Application Priority Data

Apr. 27, 2001 (JP) .......................................... 2001-132431
Jun. 19, 2001 (JP) .......................................... 2001-185476

(51) Int. Cl.$^7$ ............................ B32B 27/08; B65D 1/40; B65D 88/00
(52) U.S. Cl. ................. 428/474.4; 428/34.1; 428/34.7; 428/35.7; 428/36.9; 428/36.91; 428/411.1; 428/475.8; 428/476.1; 220/4.13; 220/62.22; 220/562
(58) Field of Search ............................ 428/474.4, 34.1, 428/34.7, 35.7, 36.9, 36.91, 411.1, 475.8, 476.1; 220/4.13, 62.22, 562

(56) References Cited

U.S. PATENT DOCUMENTS

| | | | | |
|---|---|---|---|---|
| 3,873,667 A | * | 3/1975 | Preto et al. ................. | 264/234 |
| 4,535,901 A | * | 8/1985 | Okudaira et al. ........... | 215/12.2 |
| 5,945,206 A | * | 8/1999 | Jogan et al. ................. | 428/215 |
| 6,391,412 B1 | * | 5/2002 | Hata et al. .................. | 428/36.7 |
| 6,398,059 B1 | * | 6/2002 | Hayashi et al. ............. | 220/562 |
| 6,432,548 B1 | * | 8/2002 | Alex et al. ................. | 428/475.8 |
| 6,436,547 B1 | * | 8/2002 | Toft et al. ................. | 428/474.4 |
| 6,555,243 B2 | * | 4/2003 | Flepp et al. ............. | 428/474.4 |
| 6,656,553 B2 | * | 12/2003 | Nishi et al. .............. | 428/36.91 |

* cited by examiner

Primary Examiner—P. Hampton Hightower
(74) Attorney, Agent, or Firm—Kenyon & Kenyon

(57) ABSTRACT

The present invention provides a laminate for automobile parts having a layer A made from a polyamide resin composition containing 70–99 wt % of (a) a specific polyamide polymer, and 1–30 wt % of (b-1) an ethylene copolymer containing an epoxy group and/or (b-2) an ethylene copolymer modified by an acid anhydride, and a layer B made from a resin composition containing (c-1) a polyethylene resin modified by an acid anhydride and/or (c-2) a polyethylene resin containing an epoxy group, wherein the layer A and the layer B are heat-sealed, except when (1) the layer A contains (b-1) alone as the ethylene copolymer and the layer B contains (c-2) alone as the polyethylene resin; and when (2) the layer A contains (b-2) alone as the ethylene copolymer and the layer B contains (c-1) alone as the polyethylene resin. The laminate of the present invention is superior in strength, stiffness and gasoline barrier property that the automobile parts are required to have.

18 Claims, No Drawings

LAMINATE FOR AUTOMOBILE PARTS

FIELD OF THE INVENTION

The present invention relates to a laminate for automobile parts. More particularly, the present invention relates to a laminate for automobile parts, which is superior in strength, stiffness and gasoline barrier property that the automobile parts are required to have, capable of maintaining such properties (particularly strength and stiffness) even after immersion in gasoline for a long time, and is capable of assuming high responsibility for safety required of automobile parts.

BACKGROUND OF THE INVENTION

Along with the prevailing resinification of automobile fuel tanks, resinification of various fuel parts attached to the fuel tanks are being contemplated, for which resins superior in gasoline barrier properties, such as fluororesin, ethylene vinyl alcohol resin, polyamide resin and the like, are attracting much attention. Of these, one of the most promising candidates, nylon 12 resin, has been developed for use as a material for fuel parts.

However, the gasoline barrier property of nylon 12 resin is poor as compared to numerous other polyamide resin groups and nylon 12 is not entirely sufficient as a material for fuel parts. In addition, to improve responsibility for safety required of fuel parts, a laminate thereof with a polyethylene resin used for fuel tanks is under investigation. However, nylon 12 resin has poor heat seal property with polyethylene resin, and fuel parts obtained by forming the laminate show strikingly degraded adhesion strength of the heat seal surface after immersion in gasoline for a long time, which in turn causes decreased strength and stiffness.

SUMMARY OF THE INVENTION

Accordingly, the present invention aims at providing a laminate for automobile parts, which is superior in strength, stiffness and gasoline barrier property that the automobile parts are required to have, capable of maintaining such properties (particularly strength and stiffness) even after immersion in gasoline for a long time, and is capable of assuming high responsibility for safety required of automobile parts.

According to the present invention, it has been found that a laminate, obtained by heat-sealing a specific polyamide resin composition and a specific polyethylene resin, is superior in strength, stiffness and gasoline barrier property that the automobile parts are required to have; because of the superior heat seal property of the laminate, the laminate is almost free of degraded adhesion strength of the heat seal surface after immersion in gasoline for a long time, and consequently, the strength and stiffness of the laminate can be maintained; and that the laminate can assume high responsibility for safety required of automobile parts.

Accordingly, the present invention provides the following.

(1) A laminate for automobile parts comprising a layer A made from a polyamide resin composition comprising 70–99 wt % of (a) a polyamide polymer having not less than 10 amide groups per 100 atoms constituting the backbone of a molecular chain of a polyamide polymer, and 1–30 wt % of (b-1) an ethylene copolymer containing an epoxy group and/or (b-2) an ethylene copolymer modified by an acid anhydride, and a layer B made from a resin composition comprising (c-1) a polyethylene resin modified by an acid anhydride and/or (c-2) a polyethylene resin comprising an epoxy group, wherein the layer A and the layer B are heat-sealed, except when (1) the layer A comprises (b-1) alone as the ethylene copolymer and the layer B comprises (c-2) alone as the polyethylene resin; and when (2) the layer A comprises (b-2) alone as the ethylene copolymer and the layer B comprises (c-1) alone as the polyethylene resin.

(2) The laminate of the above-mentioned (1), wherein the polyamide polymer is a polymetaxylylene adipamide resin (MXD-6) obtained by polycondensation of metaxylylenediamine and adipic acid.

(3) The laminate of the above-mentioned (1), wherein the automobile part is a valve attached to a fuel tank.

(4) A laminate for automobile parts comprising a layer A made from a polyamide resin composition comprising 70–99 wt % of (a) a polyamide polymer having not less than 10 amide groups per 100 atoms constituting the backbone of a molecular chain of a polyamide polymer, and 1–30 wt % of (b-1) an ethylene copolymer containing an epoxy group, and a layer B made from a resin composition comprising (c-1) a polyethylene resin modified by an acid anhydride, wherein the layer A and the layer B are heat-sealed.

(5) The laminate of the above-mentioned (4), wherein the polyamide polymer is a polymetaxylylene adipamide resin (MXD-6) obtained by polycondensation of metaxylylenediamine and adipic acid.

(6) The laminate of the above-mentioned (4), wherein the automobile part is a valve attached to a fuel tank.

(7) A laminate for automobile parts comprising a layer A made from a polyamide resin composition comprising 70–99 wt % of (a) a polyamide polymer having not less than 10 amide groups per 100 atoms constituting the backbone of a molecular chain of a polyamide polymer, and 1–30 wt % of (b-2) an ethylene copolymer modified by an acid anhydride, and a layer B made from a resin composition comprising (c-2) a polyethylene resin containing an epoxy group, wherein the layer A and the layer B are heat-sealed.

(8) The laminate of the above-mentioned (7), wherein the polyamide polymer is a polymetaxylylene adipamide resin (MXD-6) obtained by polycondensation of metaxylylenediamine and adipic acid.

(9) The laminate of the above-mentioned (7), wherein the automobile part is a valve attached to a fuel tank.

The present invention is explained in detail in the following.

The laminate for automobile parts of the present invention consists of layer A and layer B, wherein these layers have been heat-sealed.

1. Layer A

The layer A is made from a polyamide resin composition containing (a) a polyamide polymer and (b-1) an ethylene copolymer containing an epoxy group, and/or (b-2) an ethylene copolymer modified by acid anhydride.

Each component is explained in detail in the following.

(a) Polyamide Polymer

The "(a) polyamide polymer" used in the present invention contains an acid amide group (—CONH—) in a molecule and has not less than 10 amide groups per 100 atoms constituting the backbone of a molecular chain. To be specific, it is exemplified by, but not limited to, a polymer such as nylon 3 (25.0), nylon 4 (20.0), nylon 5 (16.7), nylon 6 (14.3), nylon 7 (12.5), nylon 8 (11.1), nylon 9 (10.0), nylon 46 (16.7), nylon 66 (14.3), nylon 610 (11.1), MXD-6 nylon (polymetaxylylene adipamide resin, 15.4), 6T nylon (14.3), 6I nylon (15.4) and the like, copolymers containing these as components, blends of these and the like. The numbers in the above-mentioned parentheses show the number of amide groups per 100 atoms constituting the backbone of a molecular chain.

In the present invention, the atoms constituting the backbone of a molecular chain of the polyamide polymer is exemplified by the following. When the polyamide polymer is nylon 3, it has a repeat unit represented by the formula

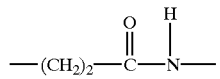

wherein, in this single repeat unit, three carbon atoms and one nitrogen atom constitute the atom forming the backbone of a molecular chain, including one amide bond.

When the polyamide polymer molecule has a ring structure, the atom forming the backbone of a chain in the ring includes two atoms at the bonding sites of the ring and the least possible number of atoms between these two atoms. When the polyamide polymer is MXD-6 nylon, for example, it has a repeat unit represented by the formula

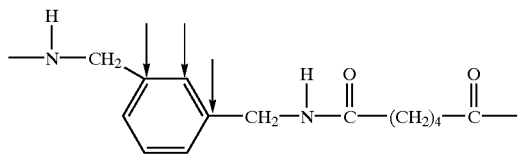

wherein, in this single repeat unit, three carbon atoms at the bonding sites constitute the atom forming the backbone of a molecular chain. Thus, 11 carbon atoms and two nitrogen atoms constitute the atom forming the backbone of a molecular chain, including two amide bonds.

While there is no clear theory as regards the gasoline barrier property of a resin, in the case of polyamide polymer, for example, the gasoline barrier property generally becomes higher as increasing numbers of amide groups in a polyamide polymer molecule. For the gasoline barrier property in the present invention, therefore, the number of the above-mentioned polyamide polymer amide groups per 100 atoms constituting the backbone of a molecular chain needs to be not less than 10. The number of the amide group is preferably not less than 14. A polyamide polymer having not less than 10 amide groups causes insufficient gasoline barrier property of the laminate using such polymer. Of the above-mentioned polyamide polymers having high gasoline barrier property, MXD-6 nylon (polymetaxylylene adipamide resin, 15.4) obtained by polycondensation of metaxylylenediamine and adipic acid is most preferable as a resin to be used for a laminate for automobile parts.

The number average molecular weight of the above-mentioned polyamide polymer to be used in the present invention is preferably 6,000–40,000, more preferably 10,000–20,000. When the molecular weight is less than 6,000, a polyamide resin composition containing such polyamide polymer becomes brittle, whereas when it is more than 40,000, a polyamide resin composition containing such polyamide polymer shows insufficient fluidity during forming.

In the present invention, the above-mentioned polyamide polymer preferably has an amino end concentration of 10–140 meq/kg, more preferably 30–100 meq/kg, from the aspect of the molecular weight of the polymer. The above-mentioned polyamide polymer preferably has a carboxyl end concentration of 10–140 meq/kg, more preferably 30–100 meq/kg, from the aspect of the molecular weight of the polymer.

(b-1) Ethylene Copolymer Having Epoxy Group

The "(b-1) ethylene copolymer having an epoxy group" to be used in the present invention is not particularly limited as long as it has an epoxy group. Preferably, it is an ethylene copolymer containing glycidyl methacrylate (GMA) as a copolymerizable component. For example, a copolymer of ethylene and GMA, and a copolymer wherein a copolymerizable component is a monomer further having a polymerizable unsaturated double bond other than ethylene can be used. The monomer further having a polymerizable unsaturated double bond other than ethylene is not particularly limited, and, for example, butene-1, octene-1, hexene-1, methyl acrylate, methyl methacrylate, acrylic acid, methacrylic acid, vinyl acetate, ethyl acrylate and the like can be used. Examples of the ethylene copolymer containing GMA as a copolymerizable component include ethylene/GMA copolymer, ethylene/butene-1/GMA copolymer, ethylene/octene-1/GMA copolymer, ethylene/hexene-1/GMA copolymer, ethylene/methyl acrylate/GMA copolymer, ethylene/methyl methacrylate/GMA copolymer, ethylene/acrylic acid/GMA copolymer, ethylene/methacrylic acid/GMA copolymer, ethylene/vinyl acetate/GMA copolymer, ethylene/ethyl acrylate/GMA copolymer and the like, particularly preferably ethylene/GMA copolymer.

The ethylene copolymer containing GMA as a copolymerizable component has a GMA content of preferably 1–30 wt %, more preferably 2–20 wt %. When the GMA content is less than 1 wt %, the heat seal property of the laminate is degraded, which in turn results in decreased adhesion strength of the heat seal surface of the laminate and decreased strength and stiffness of the laminate after immersion in gasoline for a long time, thereby possibly reducing responsibility for safety that automobile parts can assume. Conversely, when the GMA content is more than 30 wt %, an excess epoxy group is considered to react with the end amino group of polyamide polymer. Consequently, the laminate shows poor heat seal property, which in turn results in decreased adhesion strength of the heat seal surface of the laminate and decreased strength and stiffness of the laminate after immersion in gasoline for a long time, thereby possibly reducing responsibility for safety that automobile parts can assume.

(b-2) Ethylene Copolymer Modified by Acid Anhydride

The "(b-2) ethylene copolymer modified by acid anhydride" to be used in the present invention contains an acid anhydride having an unsaturated double bond as a copolymerizable component. Examples thereof include, but not limited to, high density ethylene copolymer, low density ethylene copolymer, medium density ethylene copolymer, high molecular weight ethylene copolymer, ultra high molecular weight ethylene copolymer, linear low density ethylene copolymer and the like, all of which containing an acid anhydride having an unsaturated double bond as a copolymerizable component. As used herein, the above-mentioned acid anhydride having an unsaturated double bond is not particularly limited. Examples thereof include maleic anhydride, phthalic anhydride, succinic anhydride, benzoic acid anhydride and the like, with particular preference given to maleic anhydride. Preferable examples of the "(b-2) ethylene copolymer modified by acid anhydride" include medium density polyethylene modified by maleic anhydride, and the like.

The content of the acid anhydride having an unsaturated double bond in the "(b-2) ethylene copolymer modified by acid anhydride" is preferably 0.01–15 wt %, more preferably 0.02–12 wt %. When the acid anhydride content is less than 0.01 wt %, the heat seal property of the laminate is degraded, which in turn results in decreased adhesion strength of the heat seal surface of the laminate and decreased strength and stiffness of the laminate after immersion in gasoline for a long time, thereby possibly reducing responsibility for safety that automobile parts can assume. Conversely, when the acid anhydride content is more than 15 wt %, an excess acid anhydride group is considered to react with the end carboxyl group of polyamide polymer. Consequently, the laminate shows poor heat seal property, which in turn results in decreased adhesion strength of the heat seal surface of the laminate and decreased strength and stiffness of the laminate after immersion in gasoline for a long time, thereby possibly reducing responsibility for safety that automobile parts can assume.

In the present invention, the content of the "(a) polyamide polymer" in the polyamide resin composition is 70–99 wt %, preferably 75–95 wt %, more preferably 80–90 wt %. The content of the "(b-1) ethylene copolymer containing an epoxy group" and/or the "(b-2) ethylene copolymer modified by acid anhydride" is 1–30 wt %, preferably 5–25 wt %, more preferably 10–20 wt %.

When the (b-1) and/or (b-2) content is less than 1 wt % (namely, the "(a) polyamide polymer" content is more than 99 wt %), the laminate shows superior gasoline barrier property, but the heat seal property of the laminate is degraded, which in turn results in decreased adhesion strength of the heat seal surface of the laminate and decreased strength and stiffness of the laminate after immersion in gasoline for a long time, thereby possibly reducing responsibility for safety that automobile parts can assume. Conversely, when the (b-1) and/or (b-2) content is more than 30 wt % (namely, the polyamide polymer content is less than 70 wt %), the laminate shows poor gasoline barrier property and an excess epoxy group due to (b-1) is considered to react with the end amino group of polyamide polymer and/or an excess acid anhydride group due to (b-2) is considered to react with the end carboxyl group of polyamide polymer. Consequently, the laminate shows poor heat seal property, which in turn results in decreased adhesion strength of the heat seal surface of the laminate and decreased strength and stiffness of the laminate after immersion in gasoline for a long time, thereby possibly reducing responsibility for safety that automobile parts can assume.

In the present invention, the polyamide resin composition constituting layer A can contain inorganic reinforce materials such as glass fiber, carbon fiber, various kinds of whisker, talc, mica, kaolin, clay, silica and the like, as long as the properties desired in the present invention are not impaired. As weatherability-improving materials generally used for polyamide resin compositions, carbon black, copper oxide and/or halogenated alkaline metal compound may be contained; as a light or heat stabilizer, phenolic antioxidant and phosphorus antioxidant may be contained; and moreover, pigment; dye; antistatic agent; flame retardant; lubricating material and the like may be contained.

Layer B

The layer B is made from a resin composition containing the following "(c-1) polyethylene resin modified by acid anhydride" and/or "(c-2) polyethylene resin containing an epoxy group".

(c-1) Polyethylene Resin Modified by Acid Anhydride

The "(c-1) polyethylene resin modified by acid anhydride" to be used in the present invention contains an acid anhydride having an unsaturated double bond as a copolymerizable component. While it is not particularly limited, examples thereof include high density polyethylene resin, low density polyethylene resin, medium density polyethylene resin, high molecular weight polyethylene resin, ultra high molecular weight polyethylene resin, linear low density polyethylene resin and the like, all of which containing an acid anhydride having an unsaturated double bond as a copolymerizable component. As used herein, the above-mentioned acid anhydride having an unsaturated double bond is not particularly limited, but, for example, maleic anhydride, phthalic anhydride, succinic anhydride, benzoic acid anhydride and the like can be used, with particular preference given to maleic anhydride. Preferable examples of the "(c-1) polyethylene resin modified by acid anhydride" include medium density polyethylene modified by maleic anhydride, and the like.

The content of the acid anhydride in the "(c-1) polyethylene resin modified by acid anhydride" is preferably 0.01–15 wt %, more preferably 0.05–0.8 wt %. When the acid anhydride content is less than 0.01 wt %, the laminate shows poor heat seal property, which in turn results in decreased adhesion strength of the heat seal surface of the laminate and decreased strength and stiffness of the laminate after immersion in gasoline for a long time, thereby possibly reducing responsibility for safety that automobile parts can assume. Conversely, when the acid anhydride content is more than 15 wt %, the polyethylene resin modified by acid anhydride becomes brittle. Consequently, the laminate may show decreased strength and stiffness.

(c-2) Polyethylene Resin Having Epoxy Group

The "(c-2) polyethylene resin containing an epoxy group" to be used in the present invention is not particularly limited, but an ethylene copolymer containing glycidyl methacrylate (GMA) as a copolymerizable component is preferable. Examples thereof include a copolymer of ethylene and GMA, and a copolymer comprising a monomer further having a polymerizable unsaturated double bond other than ethylene as a copolymerizable component. While the above-mentioned monomer having a polymerizable unsaturated double bond other than ethylene is not particularly limited, butene-1, octene-1, hexene-1, methyl acrylate, methyl methacrylate, acrylic acid, methacrylic acid, vinyl acetate, ethyl acrylate and the like are exemplified. Examples of the ethylene copolymer containing GMA as a copolymerizable component include ethylene/GMA copolymer, ethylene/butene-1/GMA copolymer, ethylene/octene-1/GMA copolymer, ethylene/hexene-1/GMA copolymer, ethylene/methyl acrylate/GMA copolymer, ethylene/methyl methacrylate/GMA copolymer, ethylene/acrylic acid/GMA copolymer, ethylene/methacrylic acid/GMA copolymer, ethylene/vinyl acetate/GMA copolymer, ethylene/ethyl acrylate/GMA copolymer and the like, particularly preferably ethylene/GMA copolymer.

The ethylene copolymer containing GMA as a copolymerizable component has a GMA content of preferably 1–30 wt %, more preferably 2–20 wt %. When the GMA content is less than 1 wt %, the laminate shows poor heat seal property, which in turn results in decreased adhesion strength of the heat seal surface of the laminate and decreased strength and stiffness of the laminate after immersion in gasoline for a long time, thereby possibly reducing responsibility for safety that automobile parts can assume. Conversely, when the acid anhydride content is more than 30 wt %, the ethylene copolymer containing GMA as a copolymerizable component becomes brittle. Consequently, the laminate may show decreased strength and stiffness.

When the laminate of the present invention contains layer A made from a polyamide resin composition comprising (a)

a polyamide polymer and "(b-1) an ethylene copolymer containing an epoxy group", layer B is preferably made from a resin composition comprising "(c-1) a polyethylene resin modified by acid anhydride". When layer A is made from a polyamide resin composition comprising "(a) a polyamide polymer" and "(b-2) an ethylene copolymer modified by acid anhydride", layer B is preferably made from a resin composition comprising "(c-2) a polyethylene resin containing an epoxy group". As long as the laminate of the present invention retains the superior properties, the layer A may contain both (b-1) and (b-2) and/or layer B may contain both (c-1) and (c-2) at the same time.

However, the combination of layer A containing (b-1) alone as the ethylene copolymer and layer B containing (c-2) alone as the polyethylene resin is outside the scope of the present invention. In this case, layer A contains only ethylene copolymer containing an epoxy group and does not contain an ethylene copolymer modified by acid anhydride. As a result, the epoxy group of this copolymer reacts with the carboxyl end group of the polyamide polymer, with the consequence of poor heat seal property of the laminate product and decreased adhesion strength of the heat seal surface after immersion in gasoline, as well as decreased tensile strength and tensile elongation after immersion in gasoline.

In addition, the combination of layer A containing (b-2) alone as the ethylene copolymer and layer B containing (c-1) alone as the polyethylene resin is outside the scope of the present invention. In this case, layer A contains only an ethylene copolymer modified by acid anhydride and does not contain an ethylene copolymer containing an epoxy group. As a result, the acid anhydride group of this copolymer reacts with the end amino group of the polyamide polymer, with the consequence of poor heat seal property of the laminate product and decreased adhesion strength of the heat seal surface after immersion in gasoline, as well as decreased tensile strength and tensile elongation after immersion in gasoline.

In the present invention, the resin composition constituting the layer B may contain heat stabilizer, antioxidant, ultraviolet absorber, light stabilizer, plasticizer, lubricating agent, crystal nucleator, release agent, antistatic agent, flame retardant, pigment, dye, reinforce material, and other polymers, as long as it retains the properties desired in the present invention.

The laminate for automobile parts of the present invention is produced by forming a laminate of the above-mentioned layer A and layer B, and heat sealing the layer A and layer B. The methods of lamination and heat sealing are not particularly limited and a method known per se can be used. To be specific, for example, a resin composition constituting layer B is injection-molded, the mold is rotated immediately to laminate a resin composition constituting layer A on the entirety or a partial inside surface of the molded product, followed by heat sealing (double molding); a resin composition constituting layer B is molded in advance, and, setting the molded product in the cavity of a mold of an injection molding machine, a resin composition constituting layer A is applied by second injection molding to the entirety or a partial inside surface of the molded product, followed by heat sealing (outsert or insert molding); and the like. While the method is not limited to these lamination methods, these methods are economical molding methods including monolithic molding.

The heat seal conditions are exemplified by, but not limited to, injection temperature of layer B including mold temperature of about 20–80° C., cylinder temperature of about 140–230° C., and injection temperature of layer A including mold temperature of about 60–90° C., cylinder temperature of about 230–330° C., and the like.

The laminate for automobile parts of the present invention comprises a layer A made from a polyamide resin composition comprising the above-mentioned "(a) specific polyamide polymer" and "(b-1) an ethylene copolymer containing an epoxy group" and/or "(b-2) an ethylene copolymer modified by acid anhydride", which is laminated on layer B made from a resin composition comprising "(c-1) a polyethylene resin modified by acid anhydride" and/or "(c-2) a polyethylene resin containing an epoxy group", wherein the two layers are heat-sealed. In the layer A of the laminate, the carboxyl group of the "(a) polyamide polymer" reacts with the epoxy group of the "(b-1) ethylene copolymer containing an epoxy group" (the epoxy group hardly reacts with amino group of polyamide polymer), or amino group of "(a) polyamide polymer" reacts with anhydride group of "(b-2) ethylene copolymer modified by acid anhydride" (the anhydride group hardly reacts with carboxyl group of polyamide polymer). As a result of such reaction, or both reactions, (a) and (b-1) and/or (b-2) become compatible and a polymer alloy comprising (a) as a matrix and (b-1) and/or (b-2) as domain(s) can be obtained. By heat sealing, moreover, amino group of (a) polyamide polymer in layer A reacts with acid anhydride group of "(c-1) polyethylene resin modified by acid anhydride" in layer B, or carboxyl group of "(a) polyamide polymer" in layer A reacts with epoxy group of "(c-2) polyethylene resin containing an epoxy group" in layer B. As a result of such reaction, or both reactions, the heat seal surface of the laminate shows superior adhesion strength. Taken all together, the laminate shows superior strength and stiffness, the adhesion strength of the heat seal surface of the laminate hardly shows degradation even after immersing the laminate in gasoline for a long time, and the strength and stiffness can be maintained. The laminate preferably shows tensile strength of not less than 10.0 (MPa), more preferably not less than 11.0 (MPa), preferably shows tensile elongation of not less than 20 (%), more preferably not less than 100 (%), and after immersion in gasoline at 60° C. for 7 days, preferably shows tensile strength of not less than 5.0 (MPa), more preferably not less than 6.0 (MPa), and tensile elongation of preferably not less than 3.0 (%), more preferably not less than 10.0 (%).

The laminate for automobile parts of the present invention contains a specific (having not less than 10 amide groups per 100 atoms constituting the backbone of a molecular chain) polyamide polymer and is superior in gasoline barrier property. Specifically, it shows gasoline barrier property (at 40° C.) of preferably not more than 10.0 (g·mm/m$^2$ day), more preferably not more than 2.0 (g·mm/m$^2$ day). In addition, the laminate for automobile parts of the present invention contains a polyethylene resin usable for automobile parts such as fuel tank and the like.

As described above, the laminate for automobile parts of the present invention shows extremely high responsibility for safety that automobile parts are required to have, and can be suitable used for a valve attached to a fuel tank and the like.

EXAMPLES

The present invention is explained in detail in the following by referring to Examples, which are not to be construed as limitative.

Examples 1–6 and Comparative Examples 1–4
Production of Polyamide Resin Composition Constituting Layer A As a polyamide polymer, MXD-6 (manufactured by Toyo Boseki Co., Ltd. nylon T-600, number average molecular weight 15,700, number of amide groups 15.4, amino end concentration 80 meq/kg, carboxyl end concentration 47 meq/kg) was used.

As an ethylene copolymer containing an epoxy group, Rexpearl PA3150 (ethylene/GMA copolymer, GMA content; 15 wt %, manufactured by Japan Polyolefins Co., Ltd.) was used.

The above-mentioned polyamide polymer and ethylene copolymer containing an epoxy group were mixed at a ratio shown in Table 1, kneaded in a biaxial extruder at a cylinder temperature of 285° C., and cut to give pellets.

In Comparative Example 2, nylon 12 (manufactured by Ube Industries, Ltd., Ubesta 3020U) was used as a polyamide polymer at a ratio shown in Table 1. In Comparative Example 4, an ethylene copolymer modified by acid anhydride (Mitsui Chemicals, Inc., TAFMER 5020, maleic anhydride modified EPR, maleic anhydride content; 0.8 wt %) was used at a ratio shown in Table 1, instead of the ethylene copolymer containing an epoxy group.

Polyethylene Resin Modified by Acid Anhydride Constituting Layer B

As a polyethylene resin modified by acid anhydride, a medium density polyethylene modified by maleic anhydride (specific gravity: 0.93, melting point: 130° C. MFR: 0.5 g/10 min (190° C.), maleic anhydride content: 0.2 wt %) was used.

Production of Molded Laminate

Using the above-mentioned polyethylene resin modified by acid anhydride, a dumbbell for a tensile test according to ASTM D-638 was formed and cut at the center of the tensile dumbbell. The each half of the cut dumbbell was set in the cavity of a tensile test mold, and the above-mentioned polyamide resin composition was applied by second injection molding. The cut surface of this tensile dumbbell becomes the heat sealed junction face. The conditions for the second injection molding of the polyamide resin composition were cylinder temperature of 285° C. and mold temperature of 80° C.

Examples 7–12 and Comparative Examples 5–8

Production of Polyamide Resin Composition Constituting Layer A

The polyamide polymer used was the same as that used in the above-mentioned Examples 1–6 and Comparative Examples 1, 3 and 4.

As an ethylene copolymer modified by acid anhydride, one obtained by kneading 100 parts by weight of a medium density polyethylene (specific gravity: 0.93, melting point: 130° C., MFR: 2160 g/10 min (190° C.), maleic anhydride (0.2 part by weight) and dicumyl peroxide (0.1 part by weight) in a biaxial extruder at 230° C.

The above-mentioned polyamide polymer and ethylene copolymer modified by acid anhydride were mixed at a ratio shown in Table 2, kneaded in a biaxial extruder at a cylinder temperature of 285° C., and cut to give pellets.

In Comparative Example 6, the polyamide polymer used in Comparative Example 2 was used at a ratio shown in Table 2. In Comparative Example 8, Rexpearl RA3150 (ethylene/GMA copolymer, GMA content; 15 wt %, manufactured by Japan Polyolefins Co., Ltd.) was used as a polyethylene resin containing an epoxy group at a ratio shown in Table 2, instead of the ethylene copolymer modified by acid anhydride.

Polyethylene Resin Containing Epoxy Group (Constituting Layer B)

As a polyethylene resin containing an epoxy group, Rexpearl RA3150 (ethylene/GMA copolymer, GMA content; 15 wt %, manufactured by Japan Polyolefins Co., Ltd.) was used.

Production of Molded Laminate

Using the above-mentioned polyethylene resin containing an epoxy group, a dumbbell for a tensile test according to ASTM D-638 was formed and cut at the center of the tensile dumbbell. The each half of the cut dumbbell was set in the cavity of a tensile test mold, and the above-mentioned polyamide resin composition was applied by second injection molding. The cut surface of this tensile dumbbell becomes the heat sealed junction face. The conditions for the second injection molding of the polyamide resin composition were cylinder temperature of 285° C. and mold temperature of 80° C.

The molded laminates obtained in the above-mentioned Examples 1–6 and Comparative Examples 1–4, as well as Examples 7–12 and Comparative Examples 5–8 were evaluated as regards the following properties 1 to 3, the results of which are shown in Table 1 and Table 2.

1. Gasoline Barrier Property

A polyamide resin composition constituting layer A was determined by a cup method according to JIS-Z 0208. As a test solution, a mixture of a toluene:isooctane=1:1 solution (volume ratio) in a proportion of 90 vol % and ethanol in a proportion of 10 vol % was used. The determination was done at 40° C. Based on the gasoline barrier property of this polyamide resin composition, the gasoline barrier property of the molded laminate was evaluated.

2. Tensile Strength and Tensile Elongation

Determined according to ASTM D-638.

3. Gasoline Immersion Test

As a solution for immersion, a mixture of a toluene:isooctane=1:1 solution (volume ratio) in a proportion of 85 vol % and methanol in a proportion of 15 vol % was used. After immersion at 60° C. for 7 days, the laminate was taken out, and tensile strength and tensile elongation were measured in the same manner as in the above.

TABLE 1

| | | Ex. 1 | Ex. 2 | Ex. 3 | Ex. 4 | Ex. 5 | Ex. 6 | Comp. Ex. 1 | Comp. Ex. 2 | Comp. Ex. 3 | Comp. Ex. 4 |
|---|---|---|---|---|---|---|---|---|---|---|---|
| Polyamide resin composition (layer A) | polyamide polymer MXD-6 (wt %) | 95 | 90 | 85 | 80 | 75 | 70 | 100 | | 60 | 85 |
| | nylon-12 (wt %) | | | | | | | | 100 | | |
| | ethylene polymer having epoxy group (wt %) | 5 | 10 | 15 | 20 | 25 | 30 | | | 40 | |
| | Ethylene copolymer modified by acid anhydride (wt %) | | | | | | | | | | 15 |
| Barrier property | gasoline barrier property of polyamide resin composition; (40° C., g · mm/m² · day) | 0.2 | 0.3 | 0.4 | 0.5 | 1.1 | 1.5 | 0.1 | 24.4 | 20.0 | 0.5 |

TABLE 1-continued

|  |  |  | Ex. 1 | Ex. 2 | Ex. 3 | Ex. 4 | Ex. 5 | Ex. 6 | Comp. Ex. 1 | Comp. Ex. 2 | Comp. Ex. 3 | Comp. Ex. 4 |
|---|---|---|---|---|---|---|---|---|---|---|---|---|
| Property of molded laminate (*) | start | Tensile strength (MPa) | 12.8 | 13.1 | 12.8 | 13.7 | 13.3 | 11.3 | 12.5 | 11.5 | 7.5 | 6.3 |
|  |  | tensile elongation (%) | >100 | >100 | >100 | >100 | >100 | 25.8 | 40.0 | >100 | 3.5 | 1.9 |
|  | after immersion in gasoline | Tensile strength (MPa) | 8.3 | 9.6 | 10.2 | 9.3 | 8.7 | 7.5 | 4.7 | 4.0 | 2.4 | 1.2 |
|  |  | tensile elongation (%) | 7.2 | >100 | >100 | 16.4 | 6.2 | 5.3 | 2.8 | 2.1 | 1.8 | 0.6 |

Number of amide groups per 100 atoms constituting the backbone of a molecular chain of a polyamide polymer: MXD-6 = 15.4 nylon-12 = 7.7
(*) Molded laminate of polyethylene resin modified by acid anhydride and polyamide resin coposition

TABLE 2

|  |  | Ex. 7 | Ex. 8 | Ex. 9 | Ex. 10 | Ex. 11 | Ex. 12 | Comp. Ex. 5 | Comp. Ex. 6 | Comp. Ex. 7 | Comp. Ex. 8 |
|---|---|---|---|---|---|---|---|---|---|---|---|
| Polyamide resin composition (layer A) | polyamide polymer MXD-6 (wt %) nylon-12 (wt %) | 95 | 90 | 85 | 80 | 75 | 70 | 100 | 100 | 60 |  85 |
|  | ethylene copolymer modified by acid anhydride (wt %) | 5 | 10 | 15 | 20 | 25 | 30 |  |  | 40 |  |
|  | epoxy modified ethylene copolymer (wt %) |  |  |  |  |  |  |  |  |  | 15 |
| Barrier property | gasoline barrier property of polyamide resin composition; (40° C., g · mm/m² day) | 0.2 | 0.3 | 0.4 | 0.5 | 1.1 | 1.5 | 0.1 | 24.4 | 20.0 | 0.5 |
| Property of molded laminate (*) | start tensile strength (MPa) | 12.5 | 13.0 | 13.1 | 13.8 | 13.0 | 11.5 | 12.5 | 11.5 | 7.6 | 6.9 |
|  | tensile elongation (%) | >100 | >100 | >100 | >100 | >100 | 28.1 | 38.7 | >100 | 3.9 | 1.7 |
|  | after immersion in gasoline tensile strength (MPa) | 8.8 | 9.8 | 10.5 | 9.5 | 9.0 | 8.1 | 4.7 | 4.0 | 3.1 | 1.4 |
|  | tensile elongation (%) | 13.7 | >100 | >100 | >100 | 16.0 | 6.1 | 2.8 | 2.1 | 2.1 | 0.7 |

Number of amide groups per 100 atoms constituting the backbone of a molecular chain of a polyamide polymer: MXD-6 = 15.4 nylon-12 = 7.7
(*) Molded laminate of ethylene polymer having epoxy group and polyamide resin composition Because the polyamide resin compositions of Examples 1–6 in Table 1 and Examples 7–12 in Table 2 showed extremely superior gasoline barrier property, the gasoline barrier property of the molded laminates thereof was considered to be superior. The molded laminates were superior in tensile strength and tensile elongation, as well as in tensile strength and tensile elongation even after immersion in gasoline.

In contrast, in Comparative Example 1, because the polyamide resin composition did not contain an ethylene copolymer containing an epoxy group, and in Comparative Example 5, because the polyamide resin composition did not contain an ethylene copolymer modified by acid anhydride, the molded laminates of both Comparative Examples 1, 5 showed poor heat seal property, and after immersion in gasoline, the heat seal surface showed decreased adhesion strength, as well as decreased tensile strength and tensile elongation.

In Comparative Examples 2 and 6, because the polyamide polymer was nylon 12 having less than 10 amide groups per 100 atoms constituting the backbone of a chain, the polyamide resin composition showed poor gasoline barrier property and the gasoline barrier property of the molded laminates thereof was considered to be also poor. In Comparative Example 2, because the polyamide resin composition did not contain an ethylene copolymer containing an epoxy group, and in Comparative Example 6, because the polyamide resin composition did not contain an ethylene copolymer modified by acid anhydride, the molded laminates of both Comparative Examples 2, 6 showed poor heat seal property, and after immersion in gasoline, the heat seal surface showed decreased adhesion strength, as well as decreased tensile strength and tensile elongation.

In Comparative Examples 3 and 7, because the polyamide resin composition had a smaller polyamide polymer content, the polyamide resin composition was inferior in the gasoline barrier property, and therefore, the gasoline barrier property of the molded laminates thereof was considered to be also inferior. In Comparative Example 3, because the polyamide resin composition had a greater content of the ethylene copolymer containing an epoxy group, an excess epoxy group reacted with the end amino group of the polyamide polymer. In Comparative Example 7, because the polyamide resin composition had a greater content of the ethylene copolymer modified by acid anhydride, an excess acid anhydride group reacted with the end carboxyl group of the polyamide polymer. As a result, the molded laminates of both Comparative Examples 3, 7 showed poor heat seal property, and after immersion in gasoline, the heat seal surface showed decreased adhesion strength, as well as decreased tensile strength and tensile elongation.

In Comparative Example 4, because the polyamide resin composition did not contain an ethylene copolymer containing an epoxy group but contained an acid anhydride modified ethylene copolymer instead, the acid anhydride group of this copolymer reacted with the end amino group of the polyamide polymer. In Comparative Example 8, because the polyamide resin composition did not contain an ethylene copolymer modified by acid anhydride but contained a polyethylene resin containing an epoxy group instead, the epoxy group of this resin reacted with the end carboxyl group of the polyamide polymer. As a result, the molded laminates of both Comparative Examples 4, 8 showed poor heat seal property, and after immersion in gasoline, the heat seal surface showed decreased adhesion strength, as well as decreased tensile strength and tensile elongation.

As is clear from the foregoing description, the present invention provides a laminate for automobile parts, which is superior in strength, stiffness and gasoline barrier property that the automobile parts are required to have, capable of maintaining such properties (particularly strength and stiffness) even after immersion in gasoline for a long time, and capable of assuming high responsibility for safety required of automobile parts. Such laminate can be preferably used for, for example, a valve attached to a fuel tank, other automobile parts and the like.

This application is based on application Nos. 2001-132431 and 2001-185476 filed in Japan, the contents of which are incorporated hereinto by reference.

What is claimed is:

1. A laminate for automobile parts comprising
    a layer A made from a polyamide resin composition comprising 70–99 wt % of (a) a polyamide polymer having not less than 10 amide groups per 100 atoms constituting the backbone of a molecular chain of a polyamide polymer, and 1–30 wt % of (b-1) an ethylene copolymer containing an epoxy group and/or (b-2) an ethylene copolymer modified by an acid anhydride, and
    a layer B made from a resin composition comprising (c-1) a polyethylene resin modified by an acid anhydride and/or (c-2) a polyethylene resin comprising an epoxy group, wherein the layer A and the layer B are heat-sealed,
    except when (1) the layer A comprises (b-1) alone as the ethylene copolymer and the layer B comprises (c-2) alone as the polyethylene resin; and when (2) the layer A comprises (b-2) alone as the ethylene copolymer and the layer B comprises (c-1) alone as the polyethylene resin.

2. The laminate of claim 1, wherein the polyamide polymer is a polymetaxylylene adipamide resin (MXD-6) obtained by polycondensation of metaxylylenediamine and adipic acid.

3. The laminate of claim 1, wherein the automobile part is a valve attached to a fuel tank.

4. A laminate for automobile parts comprising
    a layer A made from a polyamide resin composition comprising 70–99 wt % of (a) a polyamide polymer having not less than 10 amide groups per 100 atoms constituting the backbone of a molecular chain of a polyamide polymer, and 1–30 wt % of (b-1) an ethylene copolymer containing an epoxy group, and
    a layer B made from a resin composition comprising (c-1) a polyethylene resin modified by an acid anhydride, wherein the layer A and the layer B are heat-sealed.

5. The laminate of claim 4, wherein the polyamide polymer is a polymetaxylylene adipamide resin (MXD-6) obtained by polycondensation of metaxylylenediamine and adipic acid.

6. The laminate of claim 4, wherein the automobile part is a valve attached to a fuel tank.

7. A laminate for automobile parts comprising
    a layer A made from a polyamide resin composition comprising 70–99 wt % of (a) a polyamide polymer having not less than 10 amide groups per 100 atoms constituting the backbone of a molecular chain of a polyamide polymer, and 1–30 wt % of (b-2) an ethylene copolymer modified by an acid anhydride, and
    a layer B made from a resin composition comprising (c-2) a polyethylene resin containing an epoxy group, wherein the layer A and the layer B are heat-sealed.

8. The laminate of claim 7, wherein the polyamide polymer is a polymetaxylylene adipamide resin (MXD-6) obtained by polycondensation of metaxylylenediamine and adipic acid.

9. The laminate of claim 7, wherein the automobile part is a valve attached to a fuel tank.

10. The laminate of claim 2, wherein the laminate shows gasoline barrier property of not more than 10.0 g·mm/m² day at 40° C.

11. The laminate of claim 2, wherein the laminate shows tensile strength of not less than 10.0 MPa and tensile elongation of not less than 20%.

12. The laminate of claim 2, wherein the laminate shows tensile strength of not less than 5.0 MPa and tensile elongation of not less than 3.0% after immersion in gasoline at 60° C. for 7 days.

13. The laminate of claim 5, wherein the laminate shows gasoline barrier property of not more than 10.0 g·mm/m² day at 40° C.

14. The laminate of claim 5, wherein the laminate shows tensile strength of not less than 10.0 Mpa and tensile elongation of not less than 20%.

15. The laminate of claim 5, wherein the laminate shows tensile strength of not less than 5.0 MPa and tensile elongation of not less than 3.0% after immersion in gasoline at 60° C. for 7 days.

16. The laminate of claim 8, wherein the laminate shows gasoline barrier property of not more than 10.0 g·mm/m² day at 40° C.

17. The laminate of claim 8, wherein the laminate shows tensile strength of not less than 10.0 MPa and tensile elongation of not less than 20%.

18. The laminate of claim 8, wherein the laminate shows tensile strength of not less than 5.0 MPa and tensile elongation of not less than 3.0% after immersion in gasoline at 60° C. for 7 days.

* * * * *